United States Patent
Ryzhikov

[11] Patent Number: 5,886,827
[45] Date of Patent: Mar. 23, 1999

[54] MICROSCOPE OBJECTIVE LENS WITH SEPARATED LENS GROUPS

[75] Inventor: Lev Ryzhikov, San Mateo, Calif.

[73] Assignee: Nikon Corporation, Tokyo, Japan

[21] Appl. No.: 970,993

[22] Filed: Nov. 14, 1997

[51] Int. Cl.⁶ .................................................. G02B 21/02
[52] U.S. Cl. .......................................... 359/657; 359/656
[58] Field of Search ..................... 359/656, 657, 359/658, 659, 660, 661

[56] References Cited

U.S. PATENT DOCUMENTS

| | | | |
|---|---|---|---|
| 5,004,307 | 4/1991 | Kino et al. | 350/1.2 |
| 5,132,845 | 7/1992 | Suzuki | 359/656 |
| 5,440,422 | 8/1995 | Vollrath | 359/355 |
| 5,502,596 | 3/1996 | Suzuki | 359/657 |
| 5,517,360 | 5/1996 | Suzuki | 359/658 |
| 5,530,590 | 6/1996 | Saito | 359/658 |
| 5,532,878 | 7/1996 | Suenaga et al. | 359/657 |

FOREIGN PATENT DOCUMENTS

| | | |
|---|---|---|
| 6-331898 | 12/1994 | Japan . |
| 07281097 | 10/1995 | Japan . |
| 08082744 | 3/1996 | Japan . |
| 08082745 | 3/1996 | Japan . |
| 08082746 | 3/1996 | Japan . |
| 1203460 | 1/1996 | U.S.S.R. . |

*Primary Examiner*—Hung Xuan Dang
*Attorney, Agent, or Firm*—Skjerven, Morrill, MacPherson, Franklin & Friel LLP; Michael J. Halbert

[57] ABSTRACT

An objective lens system having a first and a second lens group that are separated by a gap where a ray bundle between the first and second lens is substantially telecentric and the second lens group has two lens elements that are also separated by a gap. The first lens element in the second lens group is a positive optical power lens and the second lens element in the second lens group is a negative optical power lens. The objective lens system has a relatively small number of lens elements and the aberration, including chromatic, spherical, coma, astigmatic difference, and distortion, are favorably corrected. In one embodiment, the objective lens system is used in a plan-achromatic microscope objective lens having a numerical aperture of 1.25 to 1.30 with a Petzval sum of 0.1. In a second embodiment, the objective lens system with is used in an achromat microscope objective lens with improved resolution and a greater than 50% transmittance of light at a wavelength of 340 nanometers.

20 Claims, 6 Drawing Sheets

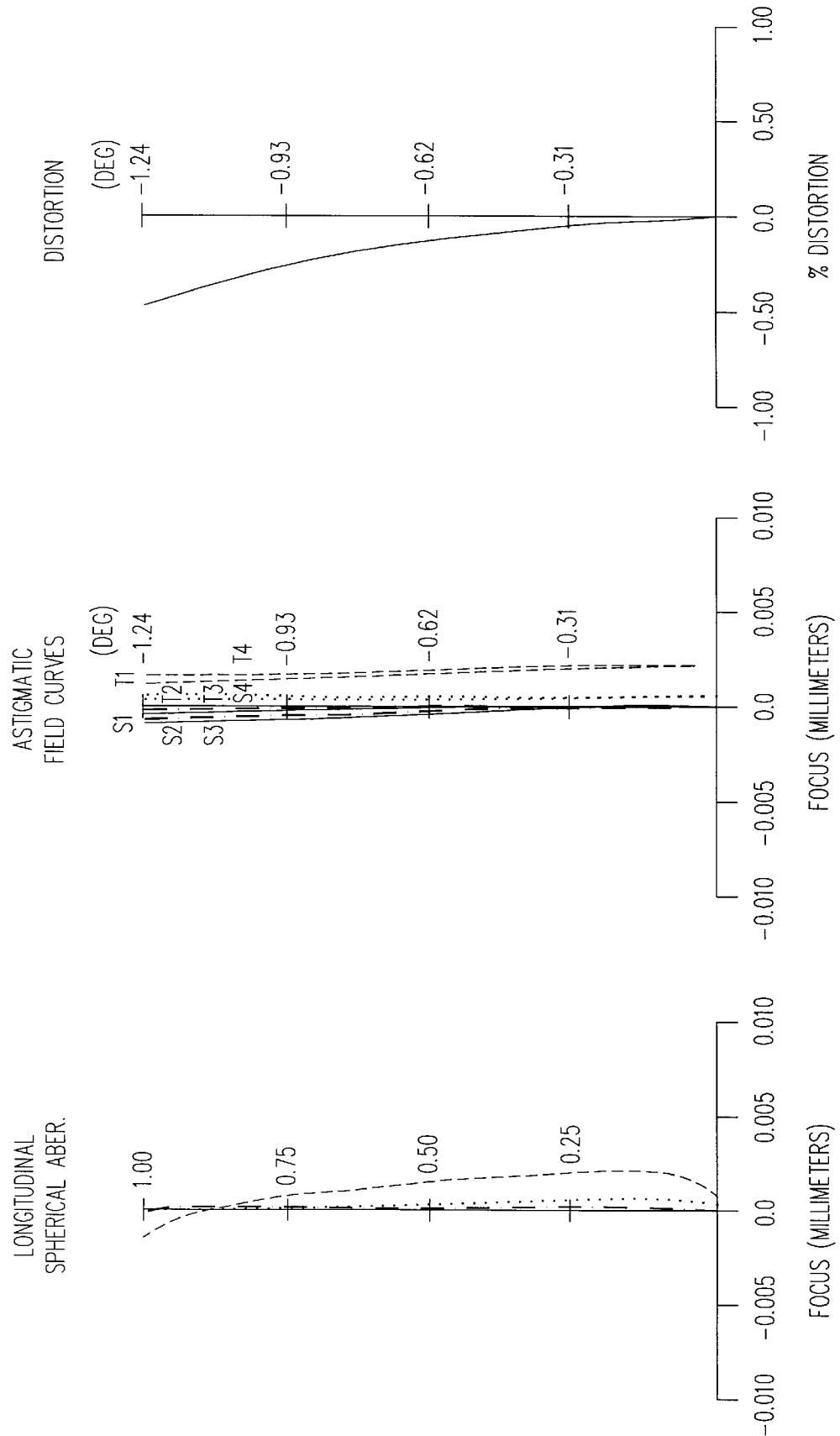

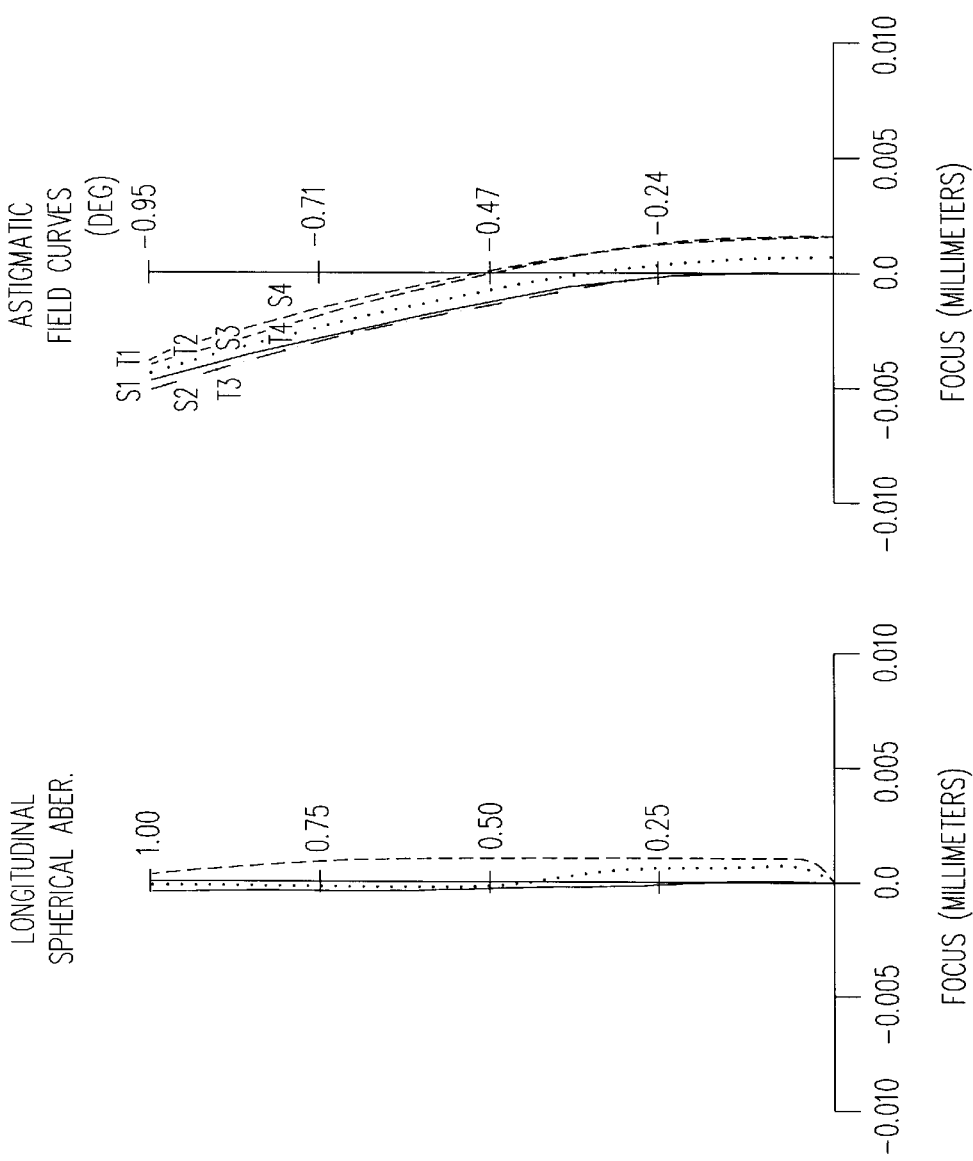

MICROSCOPE OBJECTIVE LENS WITH SEPARATED LENS GROUPS

BACKGROUND OF THE INVENTION

1. Field of invention

This invention relates to a microscope objective lens system and more particularly, to an objective lens system for light within the visible wavelengths and that may be used in a plan-achromatic immersion type infinite microscope objective with a numerical aperture of approximately 1.25 to 1.30 or an achromat immersion type infinite microscope objective which also has a transmittance of greater than 50% for ultraviolet light with a wavelength of 340 nanometers (nm).

2. Description of the Related Art

For most known plan-achromatic or achromat immersion type infinite microscope objective lenses, a large number of lens elements are used for aberration correction. Generally, additional lens elements are added to an objective lens system in order to increase aberration correction. Thus, to produce a high quality objective lens, a large number of lens elements are generally used. An objective lens system that uses a large number of lens elements, however, is expensive due to the cost of the lens elements.

Where the desired objective lens system is to have a large aperture and strong magnification, a double Gauss lens system is generally included in the objective lens. The double Gauss system typically has four to six lenses (e.g., two doublets and additional singlets, although one doublet used in conjunction with a singlet may also be used) where there are two negative lens elements located with the concave lens surfaces facing each other. See, e.g., U.S. Pat. No. 5,132,845 (FIG. 1, $r_{16}$, $r_{17}$), to Suzuki, issued Jul. 21, 1992. In order to produce strong Petzval sum correction, the concave surfaces in the double Gauss system typically have a small radius of curvature. Unfortunately, because the radius of curvature is small, the negative lens elements in the double Gauss system are sensitive to even slight deviations in the curvature. Thus, the narrow tolerances of the double Gauss system require very precise fabrication. Consequently, an objective lens that uses a double Gauss system suffers from the disadvantages of being both difficult to fabricate and expensive.

SUMMARY

In accordance with the present invention, a microscope objective lens system includes two lens groups that are spaced apart. The ray bundle between the two lens groups is approximately telecentric. The second lens group acts as a Galileo telescope lens system working with a finite distance. The second lens group has two separated lens elements; a positive lens element and a negative lens element. The second lens group has an optical power distribution that compensates for aberrations produced by the first lens group. In this manner, a relatively small number of lens elements are used to produce a high quality objective lens system that favorably corrects aberrations, such as spherical aberration, coma aberration, astigmatic difference, distortion, and chromatic aberration.

One embodiment of the present invention, shown in FIG. 1, is a plan-achromatic immersion type infinite microscope objective with a numerical aperture of approximately 1.25 to 1.30, and has a strong Petzval sum correction, e.g., 0.1, for light in the visible wavelengths. A second embodiment of the present invention, shown in FIG. 2, is an achromat immersion type infinite microscope objective lens with improved resolution and has a transmittance of greater than 50% for ultraviolet light with a wavelength of 340 nm. Thus, the present invention may be used to produce a flat image in one embodiment, or an improved resolution while permitting transmittance of ultraviolet light in another embodiment.

An objective lens in accordance with the present invention is easier to fabricate than an objective lens using a double Gauss system because the present invention uses relatively simple lens elements, which do not require the narrow tolerances found in the lens elements of the double Gauss system. Further, fewer lens elements are required to achieve substantial aberration correction. Consequently, an objective lens system in accordance with the present invention is both of high quality and inexpensive.

BRIEF DESCRIPTION OF THE DRAWINGS

FIGS. 3A, 3B, and 3C show graphs illustrating, respectively, longitudinal spherical, astigmatic field, and distortion aberration curves of the embodiment of FIG. 1.

FIGS. 5A, 5B and 5C show graphs illustrating longitudinal spherical, astigmatic field, and distortion aberration curves of the embodiment of FIG. 2.

DETAILED DESCRIPTION

Figure 1:
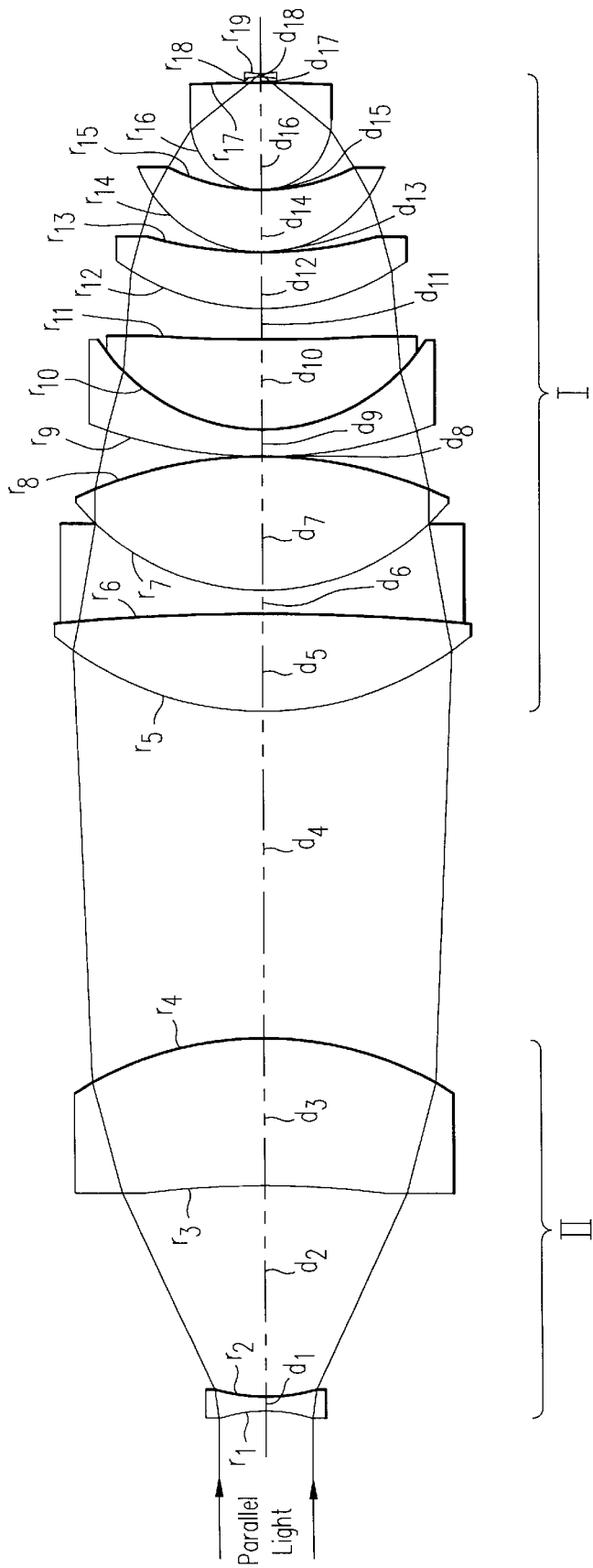
FIG. 1 shows a sectional view of a first embodiment of the present microscope objective lens system.

A microscope objective lens system according to the present invention preferably has two lens groups, separated by a gap, and preferably ten lens elements. The ray bundle between the two lens groups is substantially telecentric. In order from the object side, the first lens group may include a hemispherical lens element followed by a meniscus lens element arranged with the concave surface toward the object side. In one embodiment there is a second meniscus lens element arranged with the concave surface toward the object side followed by a cemented doublet, and in another embodiment there is a cemented triplet lens element. Both embodiments include a cemented triplet lens element as the last element of the first lens group. It is understood, however, that other lens elements and/or arrangements may also be used in the first lens group to achieve substantially telecentric rays between the first lens group and the second lens group.

The second lens group is separated from the first lens group so that there is space (e.g., air) between the two lens groups. The second lens group includes a positive lens element and a negative lens element separated by a gap, such that the second lens group acts as a Galileo telescope lens system working with a finite distance. The second lens group compensates for optical aberrations produced by the first lens group, including correcting the Petzval sum, without requiring a large number of lens elements. The second lens group also eliminates the need for lens elements with small radii of curvature requiring precise fabrication.

The first lens element in the second lens group is the positive lens element and may have several shapes. In a plan-achromatic lens system embodiment, for instance, the first lens element may be a positive meniscus lens with the concave surface located opposite the object side. Alternatively, in an achromat lens system embodiment, the first lens element may be a positive biconvex lens. The second lens element is a biconcave negative lens element. Because the second lens group acts like a Galileo telescope lens system working with a finite distance it is important that the ray bundle between the first and second lens groups is substantially telecentric, e.g., the angle between the aperture rays and the optical axis is no greater than 3 degrees.

In one embodiment the present microscope objective lens system satisfies the following conditions:

$$7 < \frac{d_4}{f} < 10; \quad (1)$$

$$4 < \frac{d_2}{f} < 10; \quad (2)$$

$$-5.5 < \frac{f'_{22}}{f} < -3.5; \quad (3)$$

$$8 < \frac{f'_{12}}{f} < 14; \quad (4)$$

$$.9 < \left| \frac{r_1}{r_2} \right| < 3; \quad (5)$$

$$0 \leq \left| \frac{f'}{f'_2} \right| < .04; \quad (6)$$

Where f' is the back focal length of the objective lens system as a whole, f'$_2$ is the back focal length of the second lens group as a whole, f'$_{12}$ is the back focal length of the first lens element in the second lens group, f'$_{22}$ is the back focal length of the second lens element in the second lens group, d$_4$ is the distance between the first and second lens groups, d$_2$ is the distance between the first and second lens elements in the second lens group, r$_1$ is the radius of curvature of the object side of the second lens element of the second lens group, and r$_2$ is the radius of curvature of the non-object side of the second lens element in the second lens group.

Condition (1) defines a suitable length of the objective lens as a whole. If the upper limit of condition (1) is exceeded, the excessive length of the objective lens system will cause object aberration, a large amount of vignetting of oblique beams, and a decreased image brightness. If the lower limit of condition (1) is exceeded, the length of the objective lens system will be short making it difficult to correct aberration without adding lenses.

Condition (2) defines a suitable structure for the second lens group. As discussed above, the behavior of the ray beams between the first and second lens groups is approximately telecentric. Consequently, the optical power of the second lens group may be very small and, thus, only a small aberration is introduced. If either the upper or lower value defined by condition (2) is exceeded, the optical power of the second lens group will be large introducing a large amount of aberration and, thus, degrading aberration correction of the objective lens system as a whole.

Condition (3) represents suitable optical power for the second lens element from the object side in the second lens group. If the upper limit of condition (3) is exceeded, the second lens element will have a negative refractive power that is too strong, and will produce high order aberration, including spherical aberration, curvature of field and coma. If the lower limit of condition (3) is exceeded, the second lens element will have a negative refractive power that is weak and will lose its effectiveness in correcting coma aberration and the Petzval sum.

Condition (4) represents suitable optical power for the first lens element in the second lens group. If the upper limit of condition (4) is exceeded, the first lens element will have a very small radius of curvature. Thus, the first lens element will have a narrow tolerance in the radius of curvature and in the lens thickness. Additionally, the first lens element will have high order spherical aberration lowering the resolution of the objective lens system.

If the lower limit of condition (4) is exceeded, the first lens element will have a positive refractive power that is weak, which will disturb the power balance between the first and second lens groups. If the power of the first lens group is increased to compensate for the weak power of the first lens element in the second lens group, the first lens group will introduce more aberration. To compensate for the increased aberration, the negative power of the second lens element in the second lens group must be increased, which will introduce higher order spherical and coma aberrations and will lower the resolution of the objective lens system.

Condition (5) defines a suitable ratio between the radii of curvature of the two surfaces of the second lens element in the second lens group. If either the upper or lower value defined by condition (5) is exceeded, one of the surfaces of the second lens element will have a radius of curvature that is too small. Consequently, the power balance between the two surfaces of the second lens element will be disturbed, i.e., the negative power of one surface of the second lens element will be too strong, while the negative power of the other surface will be too weak. The surface which has the greater power will compensate for the Petzval sum and coma aberration from the first lens group, while the surface with the weaker power will perform little aberration correction, resulting in poor aberration balance between the surfaces of the second lens element.

Condition (6) represents suitable optical power for the second lens group as a whole. If the upper limit of condition (6) is exceeded, the second lens group will have a refractive power that is too strong, and will produce aberration. The second lens group approaches the lower limit of condition (6) when f'$_2$ becomes extremely large, such as in the case where the second lens group is acting as a telescopic system with an infinite focal length.

Figure 2:
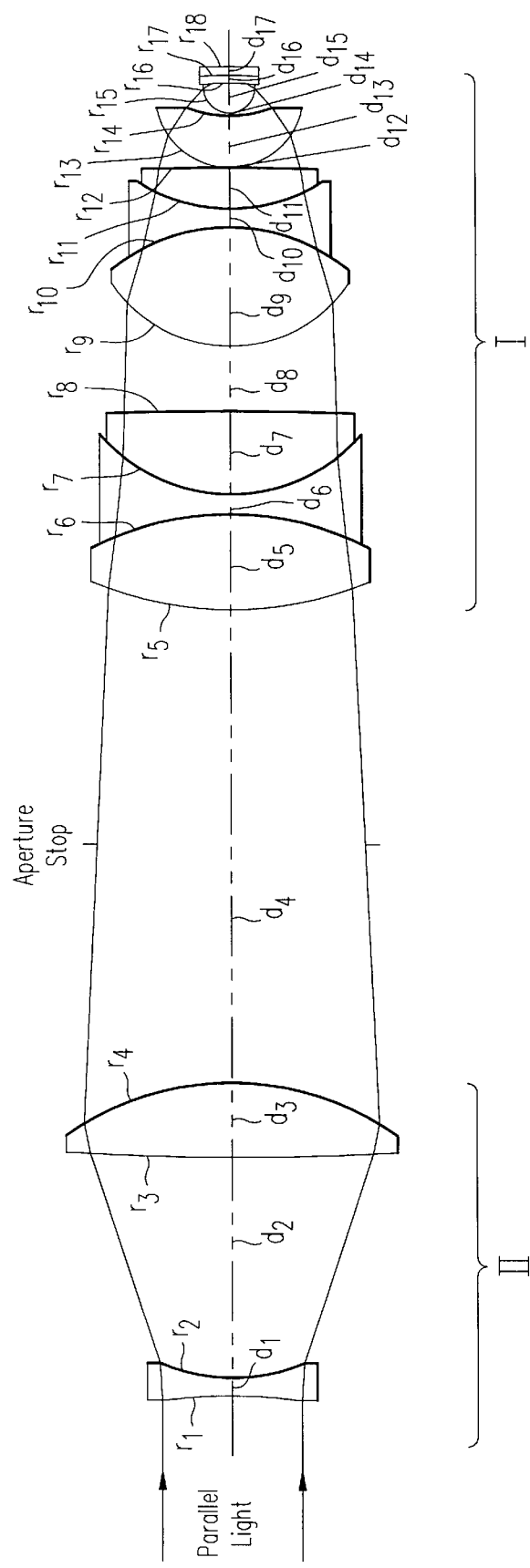
FIG. 2 shows a sectional view of a second embodiment of the present microscope objective lens system.
Figure 4A:
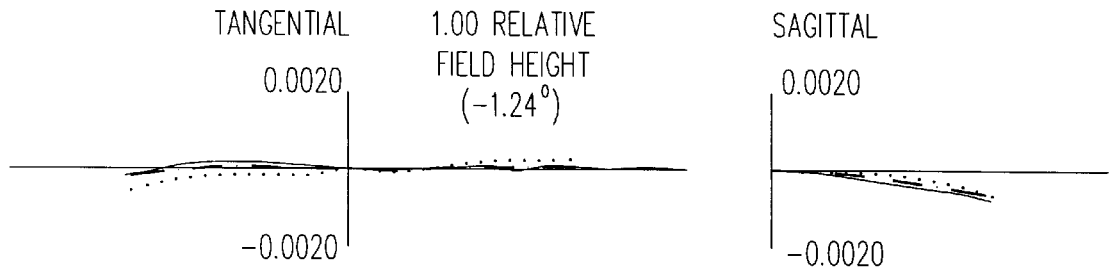
FIGS. 4A, 4B, 4C and 4D show graphs illustrating tangential and sagital aberration curves of the embodiment of FIG. 1.
Figure 4B:
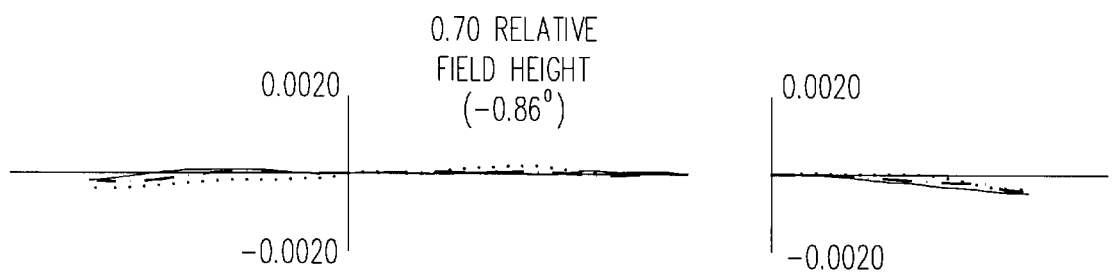
Figure 4C:
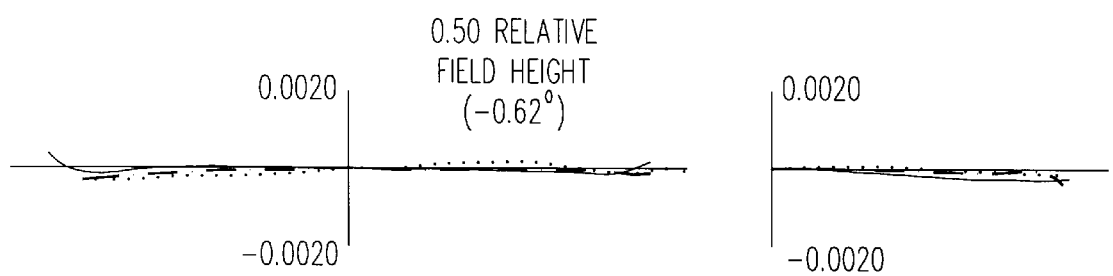
Figure 4D:
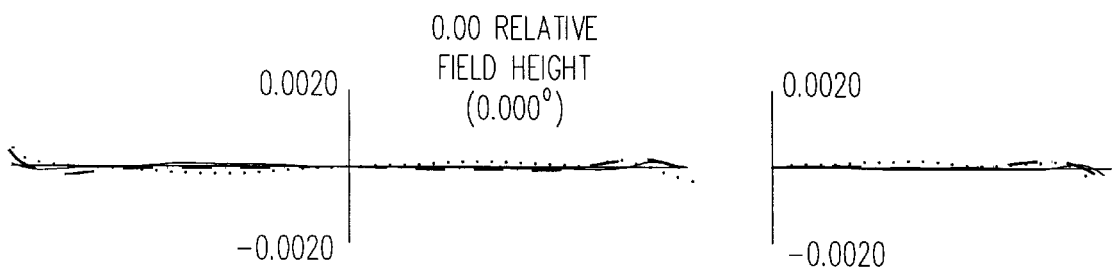
Figure 6A:
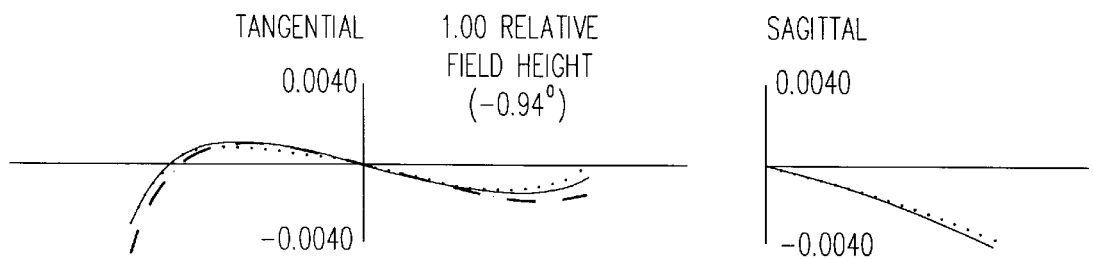
FIGS. 6A, 6B, 6C and 6D show graphs illustrating tangential and sagital aberration curves of the embodiment of FIG. 2.
Figure 6B:
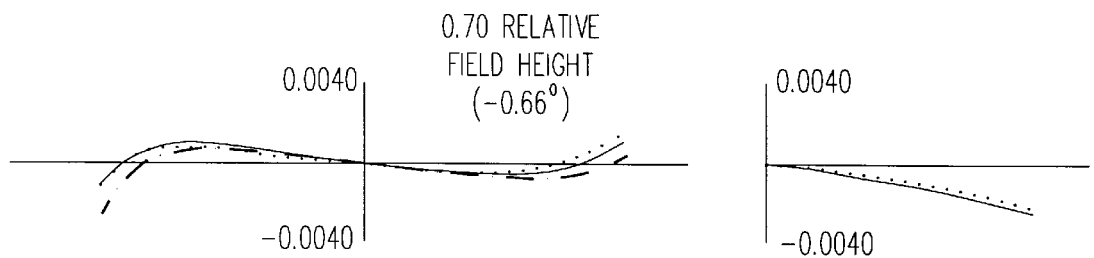
Figure 6C:
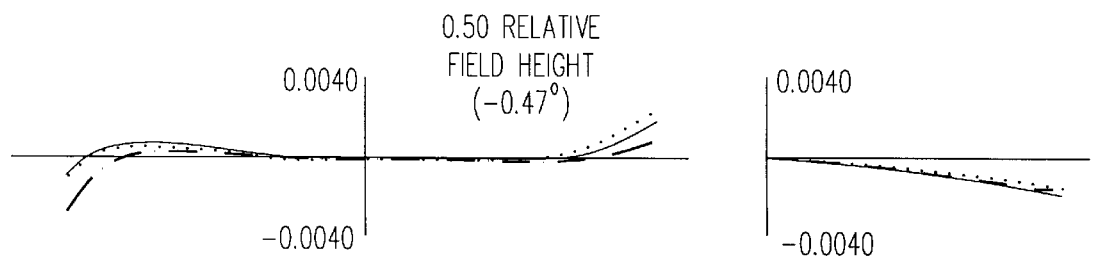
Figure 6D:
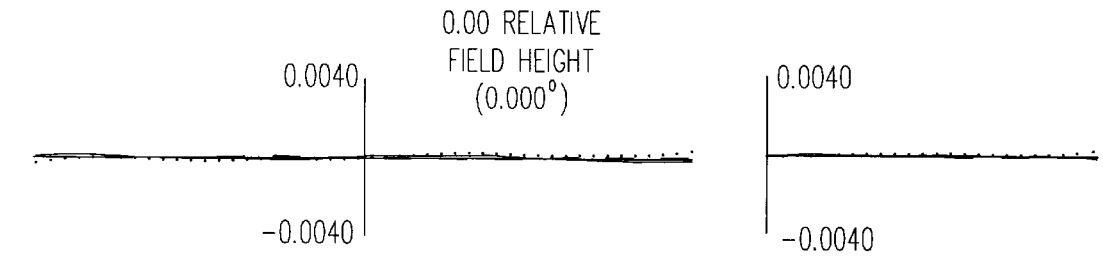

Two embodiments of the microscope objective lens system with separated lens groups according to the present invention as explained above are disclosed hereafter in greater detail and are illustrated in FIGS. 1 and 2 where the object is to the right side of the drawing and the image is to the left side.

FIG. 1 is a conventional sectional view of a first embodiment of the present objective lens system. FIG. 1 illustrates a plan-achromatic immersion type infinite microscope objective lens, which produces an image with improved flatness. An optical listing for the first embodiment follows and FIG. 1 can be understood with reference to this listing.

FIG. 1 shows, in order from the object side, an objective lens group I, which includes a cover glass that covers the sample to be imaged by the microscope, and has thickness d$_{18}$ and surfaces r$_{18}$ and r$_{19}$. The cover glass structure is not a portion of the objective lens per se but is shown for purposes of illustration. The immersion oil is defined by surfaces r$_{17}$ and r$_{18}$ and has thickness d$_{17}$, and is a conventional immersion oil placed on top of the cover glass. The immersion oil is also not a portion of the objective lens per se. A hemispherical lens element, having a thickness d$_1$, is defined by surfaces r$_{16}$ and r$_{17}$. Next is a meniscus lens element having thickness d$_{14}$ and surfaces r$_{14}$ and r$_{15}$. In the first embodiment, there is a second meniscus lens element having a thickness d$_{12}$ and surfaces r$_{12}$ and r$_{13}$ followed by a cemented doublet and a cemented triplet, which have five lens elements between them with thicknesses d$_{10}$, d$_9$, d$_7$, d$_6$, and $d_5$ and with respective surfaces $r_{11}$, $r_{10}$, $r_9$, $r_8$, $r_7$, $r_6$, and $r_5$. The second meniscus is separated from the cemented doublet by a distance $d_{11}$.

An objective lens group II is separated from objective lens group I by a distance $d_4$. Lens group II includes a positive meniscus element having a thickness $d_3$ and surfaces $r_4$ and $r_3$. A negative biconcave element, having a thickness $d_1$ and surfaces $r_2$ and $r_1$, is separated from the positive meniscus element by a distance $d_2$. Objective lens group II acts as a Galileo telescope lens system working with a finite distance, and thus the rays between objective lens group I and group II are substantially telecentric, as shown in FIG. 1.

As indicated in the following optical listing for the first embodiment, the numerical aperture of the objective microscope lens is 1.25, the magnification is 100, the back focal length of the objective lens system as a whole is 2 millimeters (mm), the back focal length of the second lens group as a whole is −88.1 mm, and the working distance is 0.21 millimeters (mm). The Petzval sum, which is a measurement of the planarity of the image, is 0.1.

| | Embodiment 1 | | |
|---|---|---|---|
| | NA = 1.25 | Magnification = −100X | |
| | WD = .21 mm | Petzval Sum = 0.1 | |
| | f′ = 2 mm | f′$_2$ = −88.1 mm | |
| Surface/ Radius (mm) | Distance/ Spacing (mm) | Refractive Index | Abbe Number |
| $r_1$ = −8.243 | | | |
| | $d_1$ = .65 | $n_d$ = 1.6129 | $v_d$ = 37.0 |
| $r_2$ = −9.153 | | | |
| | $d_2$ = 10.384 | | |
| $r_3$ = −84.45 | | | |
| | $d_3$ = 7.0 | $n_d$ = 1.8607 | $v_d$ = 23.0 |
| $r_4$ = −17.22 | | | |
| | $d_4$ = 15.615 | | |
| $r_5$ = 15.106 | | | |
| | $d_5$ = 4.65 | $n_d$ = 1.4339 | $v_d$ = 95.2 |
| $r_6$ = −109.01 | | | |
| | $d_6$ = 1.15 | $n_d$ = 1.6716 | $v_d$ = −38.8 |
| $r_7$ = 11.424 | | | |
| | $d_7$ = 6.4 | $n_d$ = 1.4339 | $v_d$ = 95.2 |
| $r_8$ = −22.31 | | | |
| | $d_8$ = .10 | | |
| $r_9$ = 23.312 | | | |
| | $d_9$ = 1.25 | $n_d$ = 1.8607 | $v_d$ = 23.01 |
| $r_{10}$ = 9.334 | | | |
| | $d_{10}$ = 4.25 | $n_d$ = 1.4342 | $v_d$ = 95.0 |
| $r_{11}$ = 117.99 | | | |
| | $d_{11}$ = 1.445 | | |
| $r_{12}$ = 12.00 | | | |
| | $d_{12}$ = 2.65 | $n_d$ = 1.5691 | $v_d$ = 71.3 |
| $r_{13}$ = 22.68 | | | |
| | $d_{13}$ = .10 | | |
| $r_{14}$ = 6.454 | | | |
| | $d_{14}$ = 2.9 | $n_d$ = 1.5691 | $v_d$ = 71.3 |
| $r_{15}$ = 9.491 | | | |
| | $d_{15}$ = .10 | | |
| $r_{16}$ = 3.454 | | | |
| | $d_{16}$ = 5.045 | $n_d$ = 1.5932 | $v_d$ = 67.9 |
| $r_{17}$ = infinity | | | |
| | $d_{17}$ = .21 | immersion oil | |
| $r_{18}$ = infinity | | | |
| | $d_{18}$ = .17 | $n_d$ = 1.5222 | $v_d$ = 58.8 |
| $r_{19}$ = infinity | | | |
| | $d_{19}$ = 0 | | |

The radii of curvature on the surfaces of the respective lens elements are $r_1$ through $r_{19}$; the thicknesses of the respective lens elements and air reserved therebetween are $d_1$ through $d_{19}$; the refractive indices of the respective lens elements are indicated as $n_d$; and the Abbe numbers of the respective lens elements are indicated as $v_d$. The refractive index and Abbe numbers are determined in the conventional manner for light with a wavelength of 589 nm.

The actual glasses to be used for the various lens elements in accordance with the optical listings are of commercially available types.

FIGS. 3 and 4 show graphically various aberration curves associated with the embodiment of FIG. 1. In FIGS. 3A, 3B and 3C the longitudinal spherical aberration, astigmatic field curves, and distortion curves are shown, respectively for wavelengths of 656.3 nm, 587.6 nm, 486.1 nm, and 435.8 nm (see key). FIGS. 4A, 4B, 4C and 4D show ray aberrations in the tangential plane and the sagital plane at relative field heights of, respectively, 1.00, 0.70, 0.50, and 0.00 for wavelengths of 656.3 nm, 587.6 nm, and 486.1 nm (see key).

A second embodiment of a microscope objective lens in accordance with the present invention is shown as a conventional sectional view in FIG. 2. The second embodiment of the present objective lens system is an achromat immersion type infinite microscope objective lens that improves the resolution of the object and has a transmittance of greater than 50% for ultraviolet light with a wavelength of 340 nm. It is understood that the second embodiment may also be used with visible light or ultraviolet light of a shorter wavelength. The second embodiment shown in FIG. 2 satisfies the above-described conditions (1) to (5).

As shown in FIG. 2, the second embodiment's objective lens group I uses a second cemented triplet with three lens elements having thicknesses $d_{11}$, $d_{10}$, and $d_9$ and respective surfaces $r_{12}$, $r_{11}$, $r_{10}$, and $r_9$, instead of using the second meniscus lens element and the cemented doublet of the first embodiment as shown in FIG. 1. The cemented triplet in the second embodiment is separated by a distance $d_8$ from another cemented triplet with lens elements having a thicknesses $d_7$, $d_6$, and $d_5$, and respective surfaces $r_8$, $r_7$, $r_6$, and $r_5$. FIG. 2 also shows an aperture stop between lens group I and lens group II. Additionally, the first and second embodiments differ in terms of lens element curvatures, the glasses, and the thicknesses/distances between optical surfaces.

The second embodiment has a high transmissibility (>53%) for ultraviolet light at 340 nm. However, the second embodiment has a Petzval sum (0.4) that is lower than the Petzval sum of the first embodiment. Thus, while the first embodiment is a plan-achromat objective lens system and improves the flatness of the image, the second embodiment is an achromatic objective lens systems and has a high transmissibility for ultraviolet light and improves resolution.

An optical listing for this second embodiment follows.

| | Embodiment 2 | | |
|---|---|---|---|
| | NA = 1.3 | Magnification = −100X | |
| | WD = .24 mm | Petzval Sum = 0.4 | |
| | f′ = 2 mm | f′$_2$ = 66.2 mm | |
| | Transmittance of light: 340 nm > 53% | | |
| Surface/ Radius (mm) | Distance/ Spacing (mm) | Refractive Index | Abbe Number |
| $r_1$ = −19.779 | | | |
| | $d_1$ = .7 | $n_d$ = 1.4875 | $v_d$ = 70.4 |
| $r_2$ = 6.655 | | | |
| | $d_2$ = 8.683 | | |
| $r_3$ = 120.46 | | | |
| | $d_3$ = 2.80 | $n_d$ = 1.5481 | $v_d$ = 45.9 |
| $r_4$ = 10.573 | | | |
| | $d_4$ = 18.157 | | |

-continued

Embodiment 2
NA = 1.3  Magnification = −100X
WD = .24 mm  Petzval Sum = 0.4
f' = 2 mm  f'$_2$ = 66.2 mm
Transmittance of light: 340 nm > 53%

| Surface/ Radius (mm) | Distance/ Spacing (mm) | Refractive Index | Abbe Number |
|---|---|---|---|
| $r_5$ = 12.978 | | | |
| | $d_5$ = 3.7 | $n_d$ = 1.4339 | $\nu_d$ = 95.2 |
| $r_6$ = 10.712 | | | |
| | $d_6$ = 0.75 | $n_d$ = 1.5750 | $\nu_d$ = 41.4 |
| $r_7$ = 6.37 | | | |
| | $d_7$ = 3.2 | $n_d$ = 1.4339 | $\nu_d$ = 95.2 |
| $r_8$ = infinity | | | |
| | $d_8$ = 2.5 | | |
| $r_9$ = 5.435 | | | |
| | $d_9$ = 4.5 | $n_d$ = 1.4339 | $\nu_d$ = 95.2 |
| $r_{10}$ = 7.29 | | | |
| | $d_{10}$ = .75 | $n_d$ = 1.6034 | $\nu_d$ = 38.02 |
| $r_{11}$ = 6.645 | | | |
| | $d_{11}$ = 1.6 | $n_d$ = 1.4413 | $\nu_d$ = 93.90 |
| $r_{12}$ = infinity | | | |
| | $d_{12}$ = 1.0 | | |
| $r_{13}$ = 2.946 | | | |
| | $d_{13}$ = 1.9 | $n_d$ = 1.7707 | $\nu_d$ = 50.2 |
| $r_{14}$ = 5.349 | | | |
| | $d_{14}$ = .10 | | |
| $r_{15}$ = 1.0269 | | | |
| | $d_{15}$ = 1.15 | $n_d$ = 1.5182 | $\nu_d$ = 58.9 |
| $r_{16}$ = infinity | | | |
| | $d_{16}$ = .24 | immersion oil | |
| $r_{17}$ = infinity | | | |
| | $d_{17}$ = .17 | $n_d$ = 1.5222 | $\nu_d$ = 58.8 |
| $r_{18}$ = infinity | | | |
| | $d_{18}$ = 0 | | |

FIGS. 5 and 6 show graphically the associated aberration curves for the second embodiment. In FIGS. 5A, 5B and 5C the longitudinal spherical aberration, astigmatic field curves, and distortion curves are shown, respectively for wavelengths of 656.3 nm, 587.6 nm, 486.1 nm, and 435.8 nm (see key). FIGS. 6A, 6B and 6C and 6D show ray aberrations in the tangential plane and the sagital plane at respectively relative field heights of 1.00, 0.70, 0.50, and 0.00 for wavelengths of 656.3 nm, 587.6 nm, and 486.1 nm (see key).

While only two embodiments of the present objective lens are shown herein, it is understood that other embodiments in accordance with the present invention are possible by varying the parameters within the ranges of the above-described five conditions. This disclosure is illustrative and not limiting; further modifications will be apparent to one skilled in the art in light of this disclosure and are intended to fall within the scope of the present claims.

What is claimed is:

1. A microscope objective lens, comprising, in order from the object to the image side:

a first lens group; and a second lens group separated from said first lens group, said second lens group having exactly two lens elements, wherein said second lens group has a positive lens element and a negative lens element separated from said positive lens element, and said second lens group has an optical power distribution between said two lens elements to compensate for optical aberrations produced by said first lens group;

wherein the following condition is met:

$$7 < \frac{d_4}{f'} < 10,$$

where $d_4$ is the distance between said first and second lens groups and f' is the overall back focal length of the objective lens.

2. The microscope objective lens of claim 1, wherein a ray bundle between said first lens group and said second lens group is substantially telecentric.

3. The microscope objective lens of claim 1, wherein the following condition is met:

$$4 < \frac{d_2}{f'} < 10,$$

where $d_2$ is the distance between the positive lens element and the negative lens element in said second lens group and f' is the overall back focal length of the objective lens.

4. The microscope objective lens of claim 1, wherein the following condition is met:

$$-5.5 < \frac{f'_{22}}{f'} < -3.5,$$

where $f'_{22}$ is the back focal length of the negative lens element of said second lens group and f' is the overall back focal length of the objective lens.

5. The microscope objective lens of claim 1, wherein the following condition is met:

$$8 < \frac{f'_{12}}{f'} < 14,$$

where $f'_{12}$ is the back focal length of the positive lens element of said second lens group and f' is the overall back focal length of the objective lens.

6. The microscope objective lens of claim 1, wherein the following condition is met:

$$.9 < \left| \frac{r_1}{r_2} \right| < 3,$$

where $r_1$ and $r_2$ are the radii of curvature of the surfaces of the negative lens element of said second lens group.

7. The microscope objective lens of claim 1, wherein the following condition is met:

$$0 \leq \left| \frac{f'}{f'_2} \right| < .04,$$

where f' is the back focal length of the objective lens system as a whole and $f'_2$ is the back focal length of the second lens group as a whole.

8. The microscope objective lens of claim 1, having a numerical aperture of approximately 1.25 to 1.30.

9. The microscope objective lens of claim 1, having greater than 50% transmittance of light at a wavelength of 340 nm.

10. The microscope objective lens system of claim 1, wherein said positive lens element is a meniscus lens element having a concave surface opposite the object side.

11. The microscope objective lens of claim 1, wherein said positive lens element is biconvex.

12. The microscope objective lens of claim 1, wherein said negative lens element lens is biconcave.

13. A microscope objective lens, comprising, in order from the object to the image side:
a first lens group; and
a second lens group separated from said first lens group, said second lens group having exactly two lens elements, wherein said second lens group has a positive lens element and a negative lens element separated from said positive lens element, and said second lens group has an optical power distribution between said two lens groups to compensate for optical aberrations produced by said first lens group;
wherein the following condition is met:

$$4 < \frac{d_2}{f'} < 10,$$

where $d_2$ is the distance between the positive lens element and the negative lens element in said second lens group and f' is the overall back focal length of the objective lens.

14. The microscope objective lens of claim 13, wherein the following condition is met:

$$-5.5 < \frac{f'_{22}}{f'} < -3.5,$$

where $f'_{22}$ is the back focal length of the negative lens element of said second lens group and f' is the overall back focal length of the objective lens.

15. The microscope objective lens of claim 13, wherein the following condition is met:

$$8 < \frac{f'_{12}}{f'} < 14,$$

where $f'_{12}$ is the back focal length of the positive lens element of said second lens group and f' is the overall back focal length of the objective lens.

16. The microscope objective lens of claim 13, wherein the following condition is met:

$$.9 < \left| \frac{r_1}{r_2} \right| < 3,$$

where $r_1$ and $r_2$ are the radii of curvature of the surfaces of the negative lens element of said second lens group.

17. The microscope objective lens of claim 13, having a numerical aperture of approximately 1.25 to 1.30.

18. The microscope objective lens system of claim wherein said positive lens element is a meniscus lens element having concave surface opposite the object side.

19. The microscope objective lens of claim 13, wherein said positive lens element is biconvex.

20. The microscope objective lens of claim 13, wherein said negative lens element lens is biconcave.

* * * * *